United States Patent [19]
Wetzel et al.

[11] 3,941,463
[45] Mar. 2, 1976

[54] METHOD OF PRODUCING A COLORED FILM FROM A BLACK-AND-WHITE PICTURE

[75] Inventors: Wilfred W. Wetzel; Ralph M. Darr, both of St. Paul, Minn.

[73] Assignee: Deloy J. White, Mexico City, Mexico

[22] Filed: Aug. 26, 1968

[21] Appl. No.: 755,051

[52] U.S. Cl. .............................. 352/38; 96/2; 96/42; 352/47; 352/50; 352/51; 352/87; 355/88
[51] Int. Cl.² ......................................... G03C 11/18
[58] Field of Search ............ 352/38, 45, 47, 50, 51, 352/87; 355/78, 88; 96/2, 42

[56] References Cited
UNITED STATES PATENTS

| | | | |
|---|---|---|---|
| 2,127,829 | 8/1938 | O'Brien | 352/51 |
| 2,450,017 | 9/1948 | Place | 352/51 |
| 2,927,857 | 3/1960 | Pohl | 96/2 |

*Primary Examiner*—Richard C. Queisser
*Assistant Examiner*—Frederick Shoon
*Attorney, Agent, or Firm*—Nilsson, Robbins, Bissell, Dalgarn & Berliner

[57] ABSTRACT

The method of producing a colored film from an exposed black-and-white picture and especially from an exposed black-and-white motion picture film wherein a black-and-white image is projected onto a surface, opaque pastel colors are applied within selected areas of the projected image and the reflected colored composite, of the opaque pastel colors and the black-and-white image superimposed thereon, is then photographed with color-sensitive film.

8 Claims, 5 Drawing Figures

INVENTORS
WILFRED W. WETZEL
RALPH M. DARR
BY Kinney, Alexander,
Sell, Steldt & DeLaHunt
ATTORNEYS INVENTORS
WILFRED W. WETZEL
RALPH M. DARR
BY Kinney, Alexander,
Sell, Steldt & DeLaHunt
ATTORNEYS

METHOD OF PRODUCING A COLORED FILM FROM A BLACK-AND-WHITE PICTURE

BACKGROUND OF THE INVENTION

It has long been the appetency of the art to convert a black-and-white positive picture, such as an opaque print, a single frame of transparent film, or a motion picture film, to a color film having gradations of color values.

Many of the black-and-white motion pictures now in storage are considered almost obsolete in the current color-saturated era merely because they are black and white. This obsolescence is especially true in the television industry where there exists a nearly exclusive demand for colored programming of motion pictures and commercials. Stored motion picture films such as "Streetcar Named Desire"; "On the Waterfront"; and "Not as a Stranger" could be in demand today if they had been originally photographed in color or could be converted to a colored film. Likewise, many of the black-and white television commercials that received particularly high public acceptance could be rerun if they could be converted to a colored film.

One method of adding color to a black-and-white motion picture is disclosed by O'Brien in U.S. Pat. No. 2,127,829, wherein the black-and-white image from a single motion picture frame is projected through accurately cut and accurately positioned colored filters onto a translucent screen and this combined image is then photographed with color-sensitive film from the opposite side of the screen. Thus, for each object within a frame, and for each distinct color within each object, a separate color filter has to be accurately cut and accurately positioned in a jigsaw-puzzle manner on the translucent screen. Adjacent filters, of the same or of different colors, may not overlap because an overlapped combination would produce a new and distinct third color between the adjacent filters; nor may the adjacent filters be mismatched to leave a gap because the gap would produce a white line on the color-sensitive film. Also, the color filters fail to transmit, in proportion to the original intensities, a significant portion of the gray scale and thus much of the black-and-white detail is lost while passing through the color filters and the number of available filters does not approach the variety of colors desired to adequately color a motion picture. The substitution of transparent paint or ink for the filters of O'Brien has been attempted, thus increasing the number of available colors, without overcoming the problem of overlapping and intermixing of adjacent transparent paint which would result in a third and distinctly new color between the originally distinct colors.

Another method of utilizing a black-and-white motion picture film to produce a colored film has been developed for producing colored animated cartoons. The first animated cartoons were produced from pictures drawn by artists showing sequential positions of moving objects on separate sheets. The sheets were then photographed on consecutive frames of a motion picture film. With a desire to eliminate a major portion of the artist's work, scenes were enacted by the aid of living actors depicting the subjects to be displayed by the cartoon and their movements were photographically recorded on a motion picture film. The motion picture was then projected from underneath a working table onto the underside of a ground-glass surface. Upon the upperside of the ground-glass surface was placed a piece of tracing paper on which an animation artist traced a verge or outline around a component part of the projected image. In tracing the projected image, the skillful artist would generally exaggerate or modify particular elements or features of the actor in order to produce grotesque characteristics on the cartoon character. The tracing paper, after being suitably colored, was then removed from the ground-glass surface for subsequent sequential photographing on a color-sensitive film. The motion picture of the live actors was therefore utilized to lend life-like realism of proportion and movement to the cartoon character but it was essential that the projected image from the black-and-white motion picture film was not photographed in combination with the traced cartoon character for the projected scene would tend to destroy the comic effect of the cartoon character.

Still another method of producing animated colored cartoons is where the motion picture background image is photographed in combination with an opaque cartoon character positioned between the projected image and the camera. Thus, the opaque cartoon character is superimposed on the actual background image and this combination is subsequently photographed. For example, see Gilmartin, U.S. Pat. No. 1,715,230.

One method of adding color to an opaque black-and-white print is the portrait tinting process wherein a photographic retoucher, an artist, mixes and applies a large variety of opaque colors directly onto an enlarged opaque black-and-white print photograph. Here, the skillful artist mixes and selects paints to selectively or completely cover and color the black-and-white photograph. The gray scale of any area to be colored is not used to produce a gradation of color; rather, additional colors are added to shade and accent the photograph to make it more natural appearing.

SUMMARY OF THE INVENTION

In addition to the economic and illustrative desires of converting a black-and-white positive picture to a color positive, the process of this invention enables a skilled photographer to purposely photograph in black-and-white, to gain artistic effects not possible with color-sensitive film, and then subsequently, creatively convert the black-and-white positive to a colored positive for aesthetic desires.

The present invention relates to a method of converting a black-and-white picture to a colored film, and more particularly to a method of projecting a black-and-white image onto a surface, adding an opaque pastel color within a selected area of the projected image, and photographing the reflected composite with color-sensitive film wherein the composite comprises the projected black-and-white image superimposed on the opaque pastel color to thereby produce a gradation of color within the selected area.

It is therefore an object of this invention to provide a novel method of producing a colored film from a black-and-white print.

It is another object of this invention to provide a novel method of producing a colored motion picture film from a black-and-white motion picture film.

Other objects and many of the attendant advantages of this invention will be readily appreciated as the same becomes better understood by reference to the following detailed description when considered in connection with the accompanying drawings in which like numerals designate like parts throughout the figures and embodiments thereof and wherein.

Figures 1, 2:
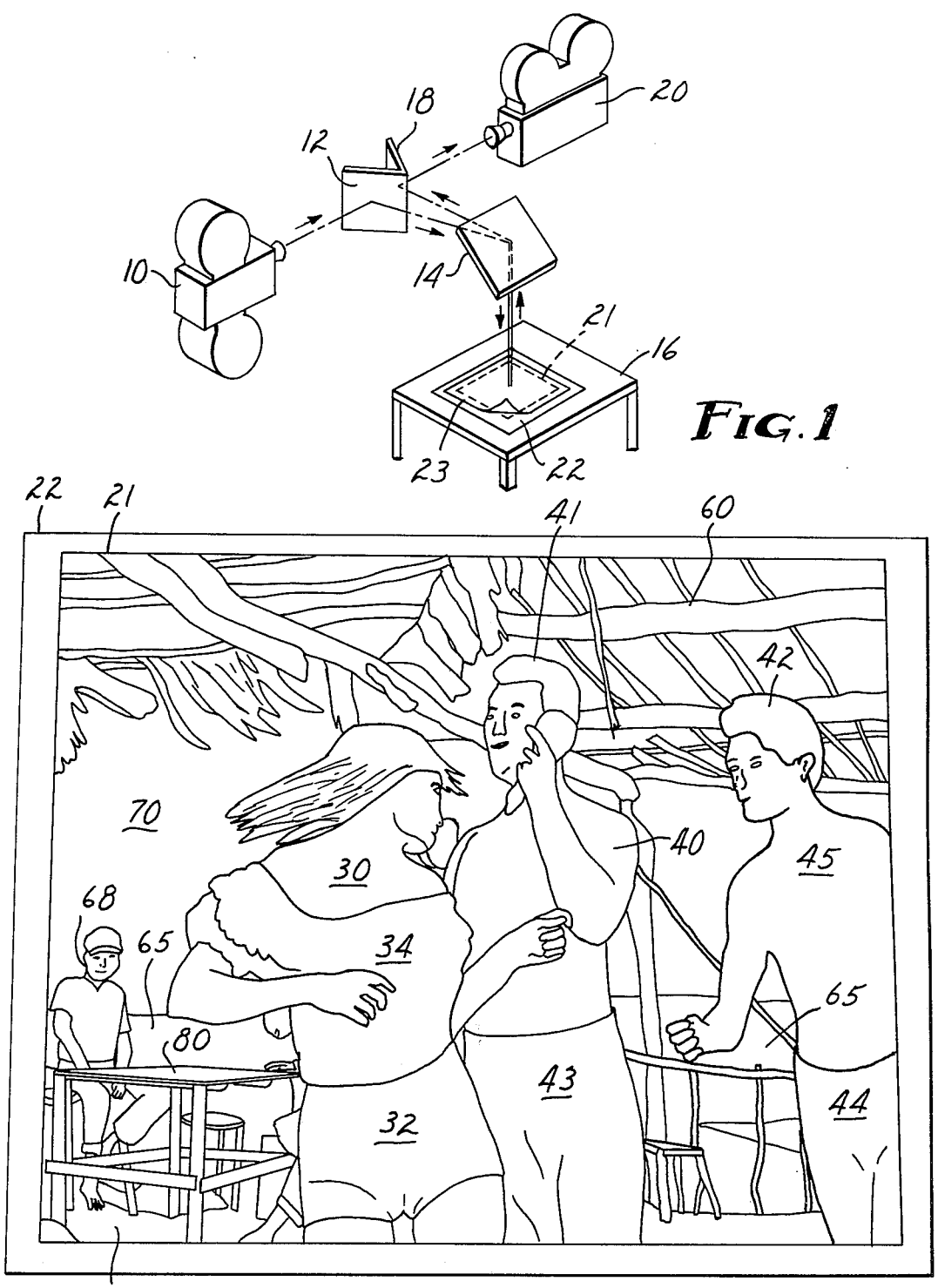
FIG. 1 is a perspective view of the apparatus for carrying out the invention.
FIG. 2 shows an outline of a black-and-white image, from a first frame of motion picture film, projected onto a working surface.

In the accompanying drawings and descriptions of the embodiment of the invention shown, FIG. 1 illustrates the utilization of a motion picture projector and a motion picture camera to perform the process of this invention. However, any other apparatus that will project an image onto a working surface, such as a slide projector or an overhead projector, could be substituted for the motion picture projector. Likewise, any other apparatus that is sensitive to the reflected colored composite such as a single-frame camera could be substituted for the motion picture camera.

Referring particularly to FIG. 1, which illustrates one embodiment of the apparatus which may be used to practice the invention, there is shown a motion picture projector 10, a first mirror 12, a second mirror 14, a table 16 having a working surface thereon, a third mirror 18, and a motion picture camera 20. A black-and-white transparent positive motion picture film, such as "The Night of the Iguana", is threadedly positioned within the projector so that a first black-and-white image 21, from a single frame, is focused onto the working surface via the first and second mirrors 12 and 14. An operator, seated at the table 16 having a white illustration board 22 and a transparent screen 23 thereon to receive the black-and-white projected image, applies opaque pastel colors within selected areas of the projected image. The working surface may include the board 22 and the screen 23 or may include the board 22 exclusive of the screen 23.

The transparent screen 23, which may be a sheet of polyester film or similarly transparent material, is used to expedite the coloring of the image when a sufficient number of frames have the same non-moving background. The background objects are then colored on the white illustration board 22 and the moving object is colored on the screen 23. As the object moves across the background, the colored screen is moved and retouched therewith and thus the total time to color an image may be reduced. It is not always desired to use a transparent screen to practice the invention and in many instances only the white illustration board 22 is used.

Figure 3:
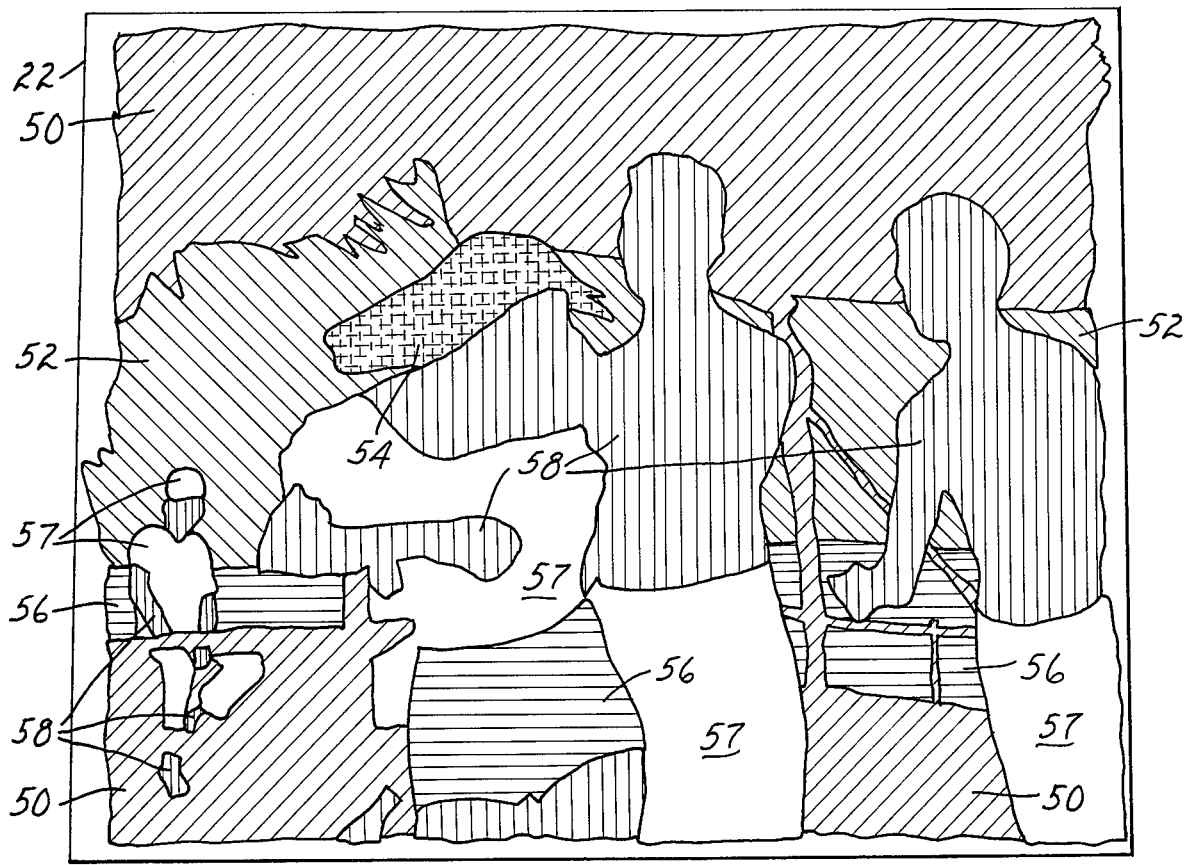
FIG. 3 shows opaque pastel colors applied to the working surface in accordance with the projected image of FIG. 2.
Figure 4:
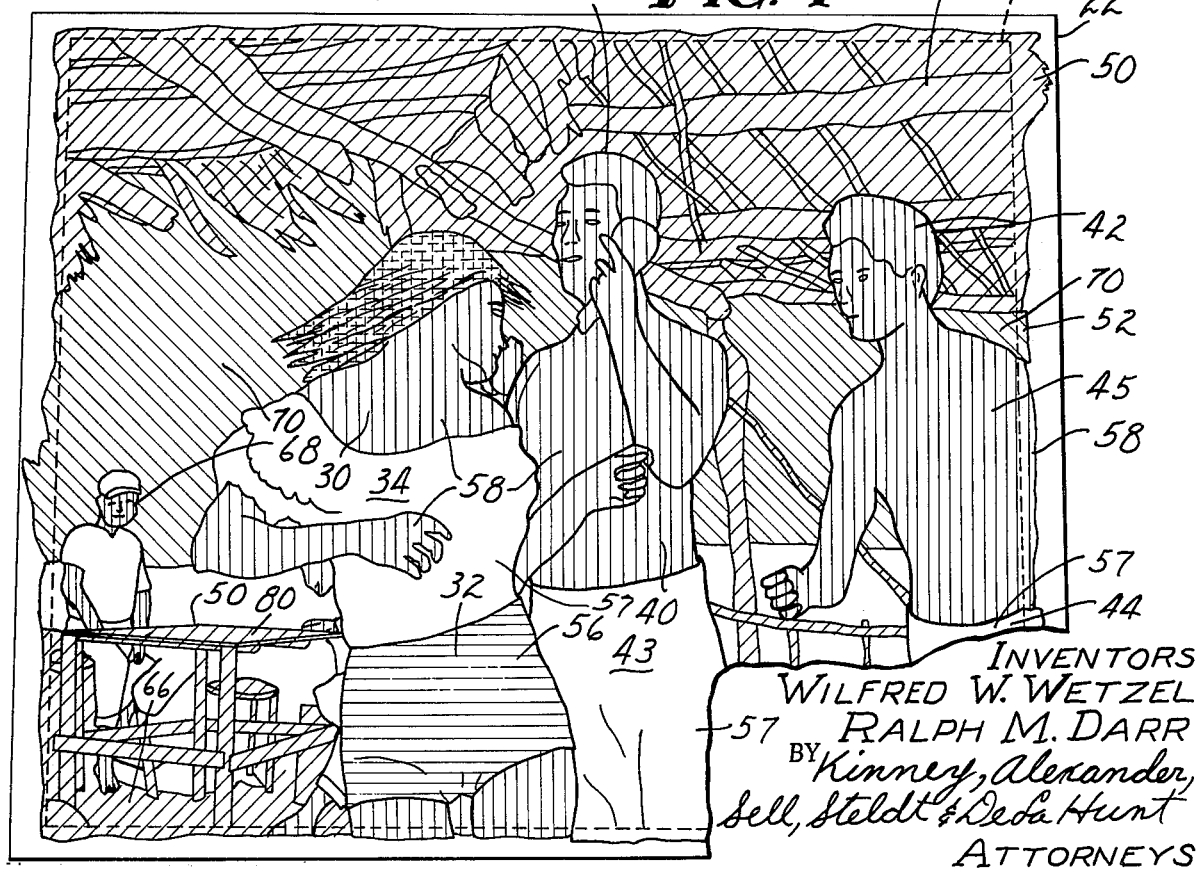
FIG. 4 shows the composite of the projected black-and-white image of FIG. 2 superimposed upon the pastel colors of FIG. 3.

In utilizing the white illustration board 22, exclusive of the transparent screen 23, a first black-and-white image 21, as shown in FIG. 2, is projected onto the board 22 and the operator applies the opaque pastel colors onto the board 22 within the outlines of image 21, as shown in FIG. 3. After the operator has sufficiently colored the white illustration board 22, the composite of the black-and-white image 21 superimposed upon the opaque colors, as shown in FIG. 4, is focused on color-sensitive film within the motion picture camera 20 via the second and third mirrors 14 and 18. The motion picture camera 20 then photographs this composite on the color-sensitive film. The operator advances the movie projector 10 to a second frame and any moving object will then be out of synchronization with the colored area of the first image. The operator will then recolor portions of the moving object with the identical opaque pastel colors used in coloring the moving object of the first frame. The background area uncovered by the moving object is also recolored by adding the proper opaque pastel color thereto. The black-and-white image is thus again in synchronization with the colored areas and again the motion picture camera 20 photographs the composite image. This cyclic process, as will become clear with reference to FIGS. 2–5, is continued throughout the length of the motion picture film.

Figure 5:
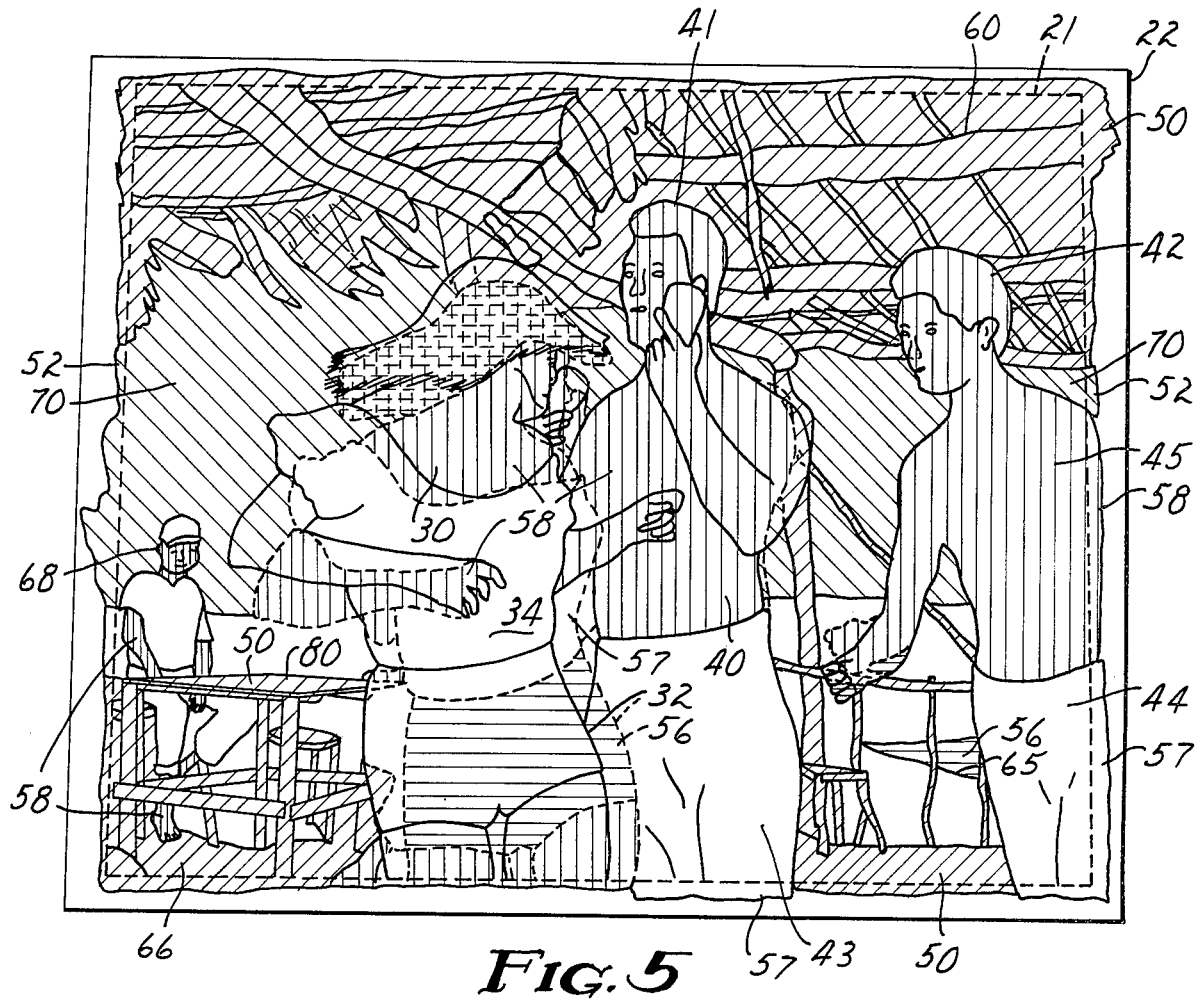
FIG. 5 indicates the amount of retouching required upon superimposing the projected black-and-white image from a second frame on the colored surface of FIG. 3.

Referring now to FIGS. 2–5, there is shown in FIGS. 2 and 4 a first frame and in FIG. 5 a second frame taken from the black-and-white motion picture "The Night of the Iguana".

FIG. 2 shows an outline of a black-and-white image 21 of a first frame, focused on the white illustration board 22, comprising a girl 30 of Scandinavian characteristics, dancing with a first male companion 40 and a second male companion 45 of Polynesian characteristics, a straw and wood roof 60 of a shelter located beside a blue river 65 and green tropical trees 70. The scene further comprises a sand floor 66 and an observer 68 seated at a wooden table 80. The blonde-haired girl 30 is wearing a white blouse 34 and blue plaid shorts 32 whereas the first and second male companions each have black hair 41 and 42 and white colored trousers 43 and 44, respectively.

FIG. 3 shows the various opaque colors that have been applied to the board 22, by the operator, within the various areas of the projected black-and-white image of FIG. 2. Thus, the straw and wood roof 60, the table 80, and the sand floor 66 of the shelter have all received the identical pastel beige color 50. The topical trees 70 have received a light-green color 52. The girl's hair has been colored yellow 54 whereas her shorts and the background river 65 have been colored a light blue 56. The girl's blouse 34, the trousers 41 and 42 and the clothes on the observer 68 have been colored an opaque white 57. The exposed skin of the Scandinavian-appearing girl 30, the exposed skin of the first and second male companions, 40 and 45, the black hair of the male companions and the exposed skin of the observer 68 have received the identical pastel pink or flesh color 58. As clearly illustrated in FIG. 3, the colors are not shaded, are not accentuated, and many different objects are colored identically, e.g., the skin of the human figures. Thus the colored areas may be crudely and quickly colored without giving attention to details, e.g., in the roof 60, the straw has not been separately colored from the wood.

Referring now to FIG. 4 there is shown the reflected composite of the black-and-white image 21, of FIG. 2, superimposed upon the opaque pastel colors of FIG. 3. The objects that actually received the same pastel color, as shown in FIG. 3, will now appear to have gradations of natural appearing colors different from other objects identically colored. In an actual color photograph of the composite, clearly showing the gradations of colors within a colored object and between identically colored objects, certain portions of the grass and wood roof 60 will now appear to be differently colored from other grass and wood within the roof 60, the tropical trees 70 will range from a light green to a dark green, the girl's blonde hair will range from areas of light blonde to areas of dark blonde, and the Scandinavian-appearing girl appears light-complexioned whereas the first and second male companions appear dark-complexioned and the hair on each first and second male companion appears to be black. Thus, the skin of the Scandinavian-appearing girl and the Polynesian companions, although each received the identical opaque pastel flesh color 58, as shown in FIG. 3, will now appear naturally shaded and colored for the race of each.

Referring now to FIG. 5, a second black-and-white image 90, from a second frame of the motion picture "The Night of the Iguana", has been superimposed upon the colored surface of FIG. 3. The figures have now moved slightly. The dotted outline portions of the girl and the two male companions represent the first image 21, whereas, the solid line outlines of the girl and her companions represent the second image 90 from the present frame. The girl's right arm has now moved into an area that was previously colored green for the tropical trees and into an area previously colored, or left white for her blouse. On the illustration board 22, the portion of the girl's right arm which now appears green in FIG. 5 will be recolored with the same pastel flesh color 58 and the portions from which her right arm has moved will be recolored green and white to provide proper synchronization between the colored areas and the projected image 90. Likewise, the areas associated with her blonde hair, her blouse, her shorts and her legs will be similarly retouched to provide proper synchronization. Similarly, the first and second male companions will be colorably retouched to provide proper synchronization between the colored areas and the projected image 90. After the operator has properly recolored the figures to synchronize the colored areas with the image 90, the motion picture camera 20 is actuated to photograph the new composite image and the projector is advanced to the next frame. This cyclic process is continued throughout the length of the film.

While one embodiment of the apparatus for carrying out this invention has been shown and described, it will be appreciated that this is for the purpose of illustration and that numerous modifications or alterations may be made to the apparatus without departing from the spirit and the scope of the invention as set forth in the appended claims.

What is claimed as the invention is:
1. The method of converting a black-and-white picture to a colored film, comprising:
   1. projecting a black-and-white image of the black-and-white picture onto a surface;
   2. applying color to said surface at selected areas of the projected black-and-white image to provide an opaque composite of applied color and superimposed black-and-white image; and
   3. while maintaining the projection of the black-and-white image on said surface, photographing with color-sensitive film the composite on the surface.

2. The method of converting a black-and-white picture to a colored film according to claim 1, wherein said black-and-white image is projected onto said surface from a black-and-white transparent film.
3. The method of converting a black-and-white picture to a colored film according to claim 1, wherein said black-and-white image is projected onto said surface from an opaque black-and-white print.
4. The method of converting a black-and-white picture to a colored film according to claim 1, wherein a plurality of colors are applied to a plurality of selected areas of said projected black-and-white image.
5. The method of converting a black-and-white picture to a colored film according to claim 1, wherein said surface comprises an illustration board and a transparent screen in front of said board, color is applied to the board for background objects, and color is applied to the transparent screen for foreground moving objects.
6. The method of converting a black-and-white motion picture film to a colored motion picture film comprising:
   a. projecting a first black-and-white image from a first frame of the black-and-white motion picture film onto a surface.
   2. applying color to said surface at selected areas of the projected first black-and-white image to provide an opaque first composite of applied color and superimposed first black-and-white image;
   3. while maintaining the projection of the first black-and-white image on said surface, photographing with color-sensitive film said first composite;
   4. projecting a second black-and-white image from a second frame of the black-and-white motion picture film onto the color-bearing surface;
   5. applying opaque color to said surface at selected areas as necessary to synchronize the colored areas with said second black-and-white image to provide an opaque second composite of applied color and superimposed second black-and-white image; and
   6. while maintaining the projection of the second black-and-white image on said surface, photographing with the color-sensitive film said second composite.

7. The method of converting a black-and-white motion picture film to a colored motion picture film according to claim 6, wherein said surface comprises an illustration board on which background objects are colored and a transparent screen in front of said board on which foreground moving objects are colored.
8. The method of converting a black-and-white picture to a colored medium, comprising:
   1. projecting a black-and-white image of the black-and-white picture onto a surface;
   2. applying color to said surface at selected areas of the projected black-and-white image to provide an opaque composite of applied color and superimposed black-and-white image; and
   3. while maintaining the projection of the black-and-white image on said surface, photographing the composite on a color-sensitive medium.

* * * * *